United States Patent
Stearns

(10) Patent No.: US 8,694,531 B1
(45) Date of Patent: *Apr. 8, 2014

(54) SYSTEM AND METHOD FOR ANALYZING AND MATCHING DIGITAL MEDIA LIBRARIES

(76) Inventor: S. Merrell Stearns, Sarasota, FL (US)

( * ) Notice: Subject to any disclaimer, the term of this patent is extended or adjusted under 35 U.S.C. 154(b) by 242 days.

This patent is subject to a terminal disclaimer.

(21) Appl. No.: 12/580,594

(22) Filed: Oct. 16, 2009

Related U.S. Application Data

(63) Continuation-in-part of application No. 12/510,715, filed on Jul. 28, 2009, now abandoned.

(60) Provisional application No. 61/089,263, filed on Aug. 15, 2008.

(51) Int. Cl.
*G06F 17/30* (2006.01)

(52) U.S. Cl.
USPC .............................. 707/767; 707/732; 707/748

(58) Field of Classification Search
USPC ......... 707/732, 733, 734, 748, 749, 758, 767, 707/771, 7.32, 7.33, 7.34, 7.48, 7.49; 705/7.11, 7.29, 7.32, 7.34, 7.37
See application file for complete search history.

(56) References Cited

U.S. PATENT DOCUMENTS

| | | | |
|---|---|---|---|
| 7,693,871 B2 | 4/2010 | Barrs et al. | |
| 7,818,355 B2 * | 10/2010 | Mills et al. | ................... 709/203 |
| 2006/0020662 A1 | 1/2006 | Robinson | |
| 2006/0143236 A1 | 6/2006 | Wu | |
| 2006/0195462 A1 | 8/2006 | Rogers | |
| 2007/0083556 A1 | 4/2007 | Plastina et al. | |
| 2008/0005179 A1 * | 1/2008 | Friedman et al. | ........... 707/104.1 |
| 2008/0147645 A1 | 6/2008 | O'Malley | |
| 2008/0154696 A1 * | 6/2008 | Spiegelman et al. | ........... 705/10 |
| 2008/0201376 A1 | 8/2008 | Khedouri et al. | |
| 2008/0235216 A1 * | 9/2008 | Ruttenberg | ....................... 707/5 |
| 2008/0250065 A1 | 10/2008 | Barrs et al. | |
| 2008/0301149 A1 * | 12/2008 | Malcolm | ......................... 707/10 |
| 2008/0319833 A1 * | 12/2008 | Svendsen | ......................... 705/10 |
| 2009/0157693 A1 | 6/2009 | Palahnuk | |
| 2011/0113051 A1 * | 5/2011 | Lindahl et al. | ................. 707/758 |

* cited by examiner

*Primary Examiner* — Greta Robinson

(74) *Attorney, Agent, or Firm* — Cesari and McKenna, LLP; Michael R. Reinemann

(57) ABSTRACT

A system and method matches individuals based on the content of their media libraries. The system has a media content processor that extracts information from a media file, and creates one or more media records. The system further includes a matching engine that compares the media records associated with different people, and determines the similarities between the media libraries of the different people. The matching engine may generate a match score for each pair of media records. The system also includes a presentation engine that provides an indication of the degree of match between the media file of one person and the media files of others.

19 Claims, 13 Drawing Sheets

| USER NAME 602 | PASSWORD 604 | EMAIL 606 | FULL NAME 608 | ADDRESS 610 | TELEPHONE No. 422/612 | AGE 614 | OCCUPATION 616 | PAYMENT INFORMATION 618 | LINK TO MEDIA RECORD 620 |
|---|---|---|---|---|---|---|---|---|---|
| | | | | | | | | | |

FIG. 7

| MUSIC FILES 702 | | | | | | | | |
|---|---|---|---|---|---|---|---|---|
| SONG TITLE 712 | COMPOSER NAME 714 | PERFORMER NAME 716 | ALBUM NAME 718 | GENRE 720 | TRACK No. 722 | USER RATING 721 | PLAY COUNT 723 | |
| | | | | | | | | |

| MOVIE FILES 704 | | | | |
|---|---|---|---|---|
| MOVIE TITLE 724 | DIRECTOR 726 | ACTORS 728 | GENRE 730 | LAST PLAYED 731 |
| | | | | |

| TELEVISION PROGRAM FILES 706 | | | |
|---|---|---|---|
| PROGRAM TITLE 732 | PROGRAM SERIES 734 | ACTORS 736 | GENRE 738 |
| | | | |

| OTHER VIDEO FILES 708 | |
|---|---|
| TITLE 740 | CREATOR 741 |
| | |

| AUDIOBOOK FILES 710 | | |
|---|---|---|
| TITLE 742 | AUTHOR 744 | GENRE 746 |
| | | |

| MEMBER USER NAME | SCORE | LINK TO MEMBER PROFILE RECORD |
|---|---|---|
| Sal5666 | 988 | LINK TO Sal5666 |
| LeslieT | 866 | LINK TO LeslieT |
| Wanderbird | 679 | LINK TO Wanderbird |
| Tahoma | 666 | LINK TO Tahoma |
| Ariel24 | 632 | LINK TO Ariel24 |
| BradleyITC | 555 | LINK TO BradleyITC |

FIG. 8

SYSTEM AND METHOD FOR ANALYZING AND MATCHING DIGITAL MEDIA LIBRARIES

CROSS-REFERENCE TO RELATED APPLICATIONS

The present application is a continuation-in-part (CIP) application of U.S. patent application Ser. No. 12/510,715, which was filed on Jul. 28, 2009, now abandoned, by S. Merrell Stearns for a SYSTEM FOR MATCHING INDIVIDUALS BASED ON MUSICAL LIBRARIES OR OTHER CONTENT and is hereby incorporated by reference in its entirety, which claims the benefit of U.S. Provisional Patent Application Ser. No. 61/089,263, filed Aug. 15, 2008 for a SYSTEM FOR MATCHING INDIVIDUALS BASED ON MUSICAL LIBRARIES OR OTHER CONTENT by S. Merrel Stearns.

BACKGROUND OF THE INVENTION

1. Field of the Invention

The present invention relates to systems and methods for comparing data and, more specifically, to systems and methods for comparing and matching media libraries.

2. Background Information

A number of services are currently available to assist an individual in finding a suitable match for companionship, social networking or other purposes. These services include professional matchmakers, membership-based online dating services, and online social networking services. Professional matchmakers typically interview new clients to gather information that the matchmaker deems useful in the matchmaking process. The client may also specify the characteristics he or she desires in a mate. The professional matchmaker then searches his or her files to identify suitable matching clients to introduce to each other.

More recently, online dating services accessible through the World Wide Web ("web") have emerged, such as www.e-harmony.com, www.matchmaker.com, and Yahoo! Personals, among others. Typically, users join these on-line dating sites as members, and enter personal information into the site's database. As a member, the user can then search the information entered by other members to find a potential match. If a potential match is found, the user can contact that member, typically by phone or e-mail. Some online dating sites utilize computer-based recommendation engines that perform or assist in the selection of potential matches. Some online dating sites may ask members to answer a series of questions that are intended to reveal the member's personality. The answers to some or all of these questions may then be used in the matching process.

Existing matchmaking services have many shortcomings. Professional matchmakers, for example, can be expensive, and prospective clients are limited to the judgment of a single or small number of people, and are also limited to the pool of other people also hired by that particular matchmaker, which may represent only a small number of people. Existing online dating sites also have deficiencies. For example, in many cases, little or no checking is done on the information entered by members. Accordingly, the information is often exaggerated.

Another type of web site is a social networking service, such as www.facebook.com and www.myspace.com, among others. Social networking sites allow members to form groups of friends or associates. A member can invite other people to join the member's network. Members can also search for and contact other members of the social networking site. Social networking sites, however, are not well-suited for identifying or meeting other people. Typically, a member's network includes only those people that the member already knows either directly or indirectly. Accordingly, a person's network is often constrained by the people he or she already knows, or the limited information members can provide on questionnaires.

SUMMARY OF THE INVENTION

A system and method compares the digital media files from the media library of a first user with the digital media files of the libraries of other users. For each user, a data set is created that holds information that is descriptive of the digital media files contained in the media library of the respective user. The data set may include information such as song title, artist name, album name, movie title, actor name, frequency of access, podcasts, videos, movies, and TV programs, etc. The data set for a first user is compared with each of the other data sets to identify the descriptive information that is common between each pair of data sets. A matching algorithm compares each pair of data sets, and generates a corresponding score that reflects the amount of descriptive information that is common between the two data sets. A high score reflects a high degree of similarity between the two libraries. The scores may be presented to the user associated with the data set that was compared to all of the other data sets so as to identify other users that share common interests or tastes in media. In an embodiment, the user may specify additional criteria for determining matches, such as personal information provided by the other users, e.g., location, sex, age, occupation, etc.

BRIEF DESCRIPTION OF THE DRAWINGS

The invention description below refers to the accompanying drawings, of which:

FIGS. 6-8 are schematic illustrations of data structures in accordance with embodiments of the present invention.

DETAILED DESCRIPTION OF AN ILLUSTRATIVE EMBODIMENT

Figure 1:
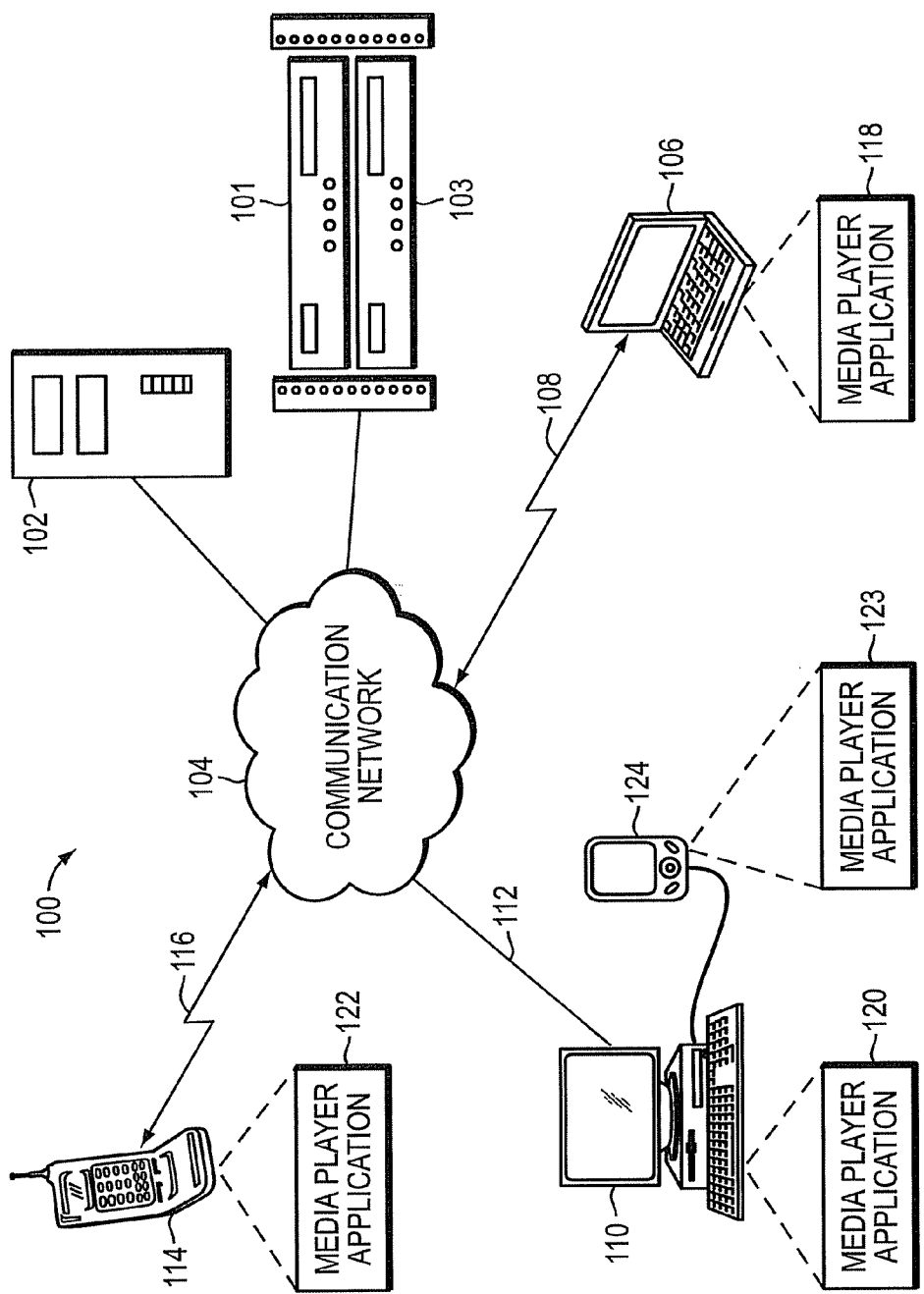
FIG. 1 is a schematic illustration of an environment in accordance with an embodiment of the present invention.

FIG. 1 is a schematic illustration of an environment 100 in which the present invention may be utilized. The environment 100 may include one or more matching servers, such as servers 101, 102 and 103, that may each be coupled to a communication network 104, which may be or may include the Internet. Also coupled to the communication network 104 may be a plurality of data processing devices that are associated with users or customers, such individuals looking to identify others who share an interest in the same music or other media. Specifically, a laptop computer 106, which may be utilized by a first user, may be coupled to the communication network 104, e.g., through a wireless connection, designated generally by 108. A desktop computer 110, which may be utilized by a second user, may be coupled to the communication network 104, e.g., through a wired link 112. A smart phone or personal digital assistant (PDA) 114, which may be utilized by a third user, may be coupled to the communication network 106, e.g., through a wireless connection, designated generally 116.

As described herein, the electronic server 102 provides services to the data processing devices 106, 110 and 114, i.e., electronic clients. It should be understood that the communication network 104 may include or be connected to other networks, such as cellular telephone networks, the public switched telephone system, private networks, satellite-based networks, etc. It should be further understood that other, possibly far more complex, network designs may be implemented. Another network design that may be used is a star or hub and spoke topology with the one or more servers as the center of the hub or star.

Each client data processing device may include a media player application, which is an application for organizing and playing back media files. For example, the laptop computer 106 may include media player application 118, the desktop computer 110 may include media player application 120, and the PDA 114 may include media player application 122. It should be understood that a media player application, such as application 123, may also reside on a portable, digital media player device, such as MP3 player 124, which is shown connected to the desktop computer 110. A media player application may also reside on a mobile phone, such as the iPhone mobile phone from Apple, Inc. of Cupertino, Calif.

Figure 2:
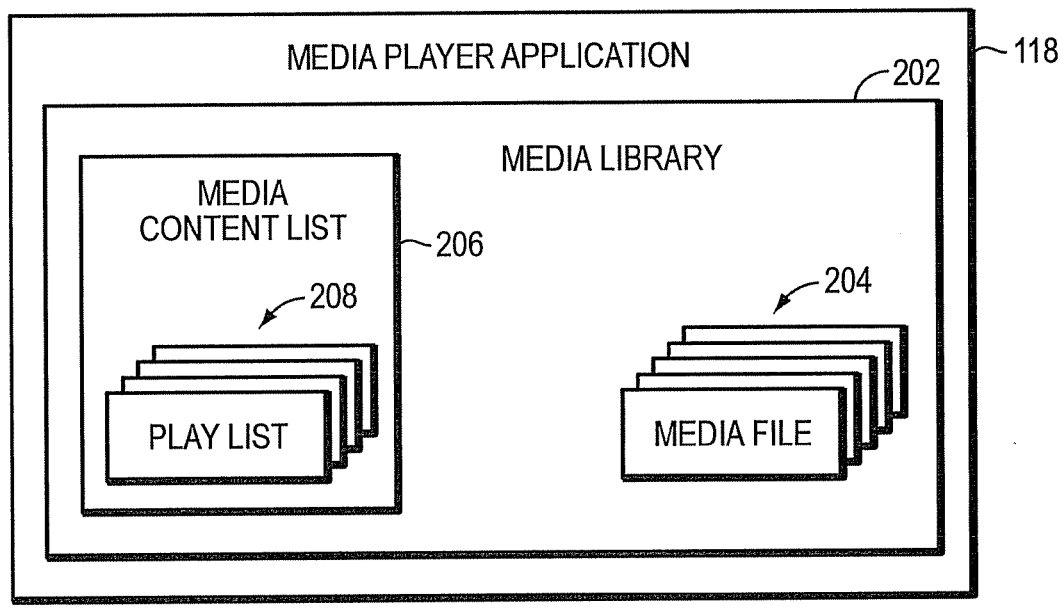
FIG. 2 is a schematic illustration of a media player application.

FIG. 2 is a schematic illustration of an exemplary media player application, such as media player application 118, which resides on the laptop computer 106. In an embodiment, the media player application 118 includes or has access to a media library 202. The media library 202, in turn, includes a plurality of digital media files, designated generally 204, and one or more media content lists, such as media content list 206. Each digital media file 204 may correspond to a single playable unit, such as a song, a movie, a video, a television show, a podcast, an audiobook, etc. Exemplary digital media file formats include MPEG Layer 3 (MP3) files, Windows Media Audio (WMA) files, Advanced Audio Coding (AAC) files, RealAudio (RA) files, Windows Media Video (WMV) files, RealMedia (RM) files, etc. The media content list 206 also may include zero, one or more playlists, designated generally 208.

Suitable media player applications include the iTunes and iPod applications from Apple, Inc., the Windows Media Player application from Microsoft Corp. of Redmond, Wash., and the RealPlayer application from RealNetworks, Inc. of Seattle, Wash., among others.

The media content list 206 may be or may include one or more digital data files that store information about the particular media, i.e., media files 204, in the media library 202. For example, the iTunes application creates two files, an 'iTunes Library.itl' file and an 'iTunes Music Library.xml' file, both of which store information about the media in the media library. This information includes such things as song title, artist name, album title, track number, etc.

As shown, a user's media library 202 stores a plurality of media files 204 also referred to as digital playable units that are of interest to the respective user, and typically have been acquired, e.g., purchased, and built-up by that user over a period of time. As indicated, the media library 202 may be separate from the media player application 118, and include just the media files 204, while the media player application 118 includes or has access to the media content list 206 and playlists 208.

It should be understood that the media files 204 making up a particular media library 202 may be acquired in a number of different ways. For example, one or more songs may be downloaded to and stored in the media library 202, e.g., as media files 204, from a service, such as the online iTunes store from Apple, Inc. One or more songs, movies or other media may be imported into the music library 202 from another medium, such as a Compact Disc (CD) or a Digital Versatile Disc (DVD). Songs or other media may also be digitized and imported from an analog storage medium, such as a record, a cassette, or a videotape, among others.

The terms media file and digital playable unit are each intended to include all forms of digital audio and audiovisual media, such as music, movies, videos, podcasts, audiobooks, mobile phone ring tones, applications, such as games, etc. For example, a digital playable unit may include a song, a full length movie, a television program, etc. Typically, the actual contents of the media libraries among various users will vary, oftentimes significantly. Because it is typically purchased, the particular media stored in a person's media library often provides an accurate indication of that person's true tastes and interests, e.g., in music, movies, books, etc.

A playlist, such as the playlists 208, is a sequential list of songs, titles, musical or otherwise, that the user has created and/or saved. A playlist may be custom created by the user from the media stored in the library 202. Alternatively, a playlist may be created automatically by the media player application from one or more "seed" songs selected by the user. For example, the iTunes application includes a tool, called Genius, that creates playlists from a seed song selected by the user. In addition, the Windows Media Player application includes a tool that builds playlists based on genre. A playlist may also be downloaded from a website, or created with other applications. Because a user often spends considerable time creating and saving playlists, and typically selects his or her favorite songs for inclusion in his or her playlist, they too often provide an accurate indication of the person's true tastes in music. A user also plays back those media files that are of significant interest to the user, and many media player applications track the frequency, e.g., play count, of the library's media files that are selected for playback by the user.

Figure 3:
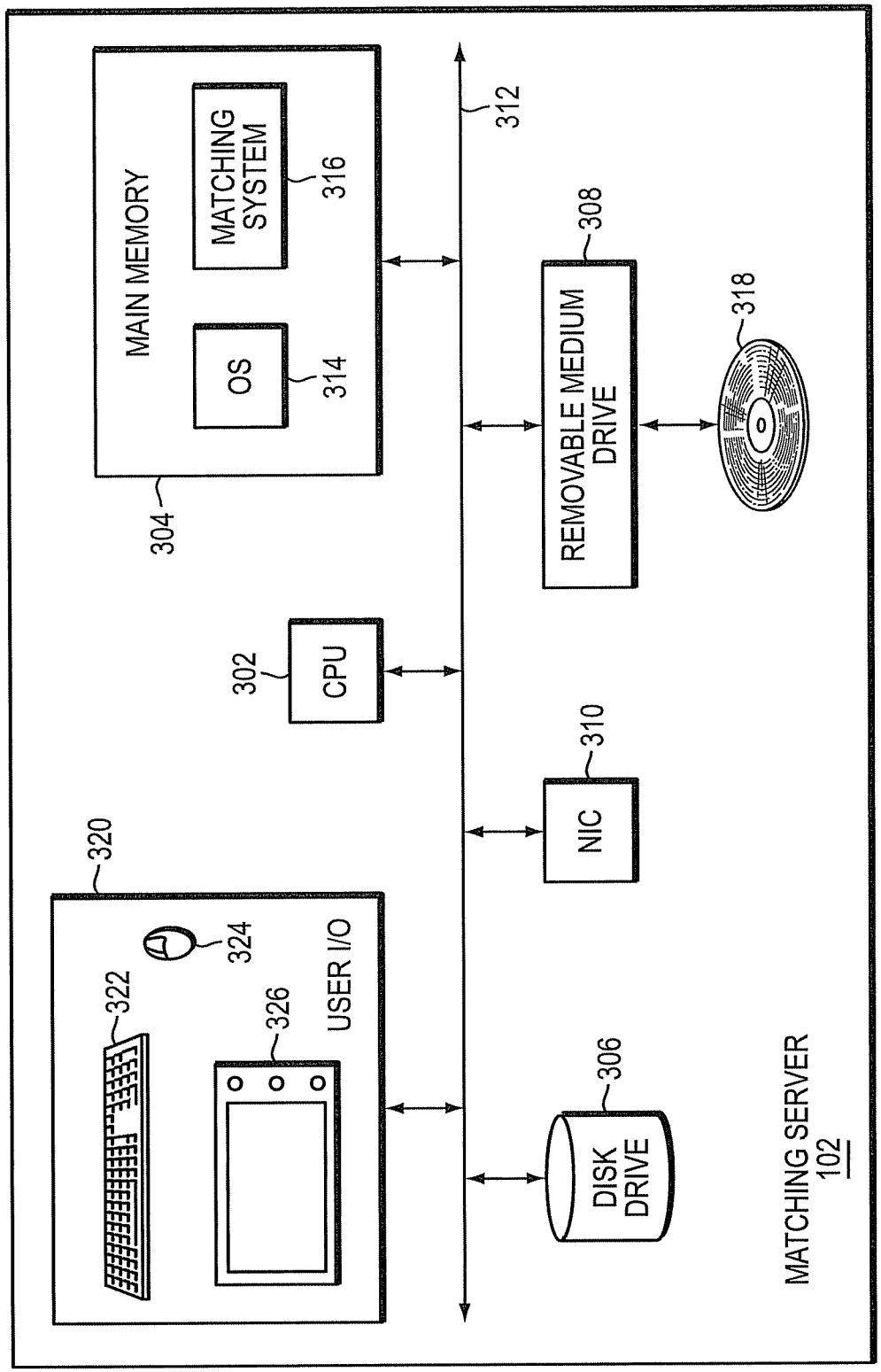
FIG. 3 is a schematic illustration of a matching server in accordance with an embodiment of the present invention.

FIG. 3 is a schematic, hardware illustration of an exemplary matching server, such as server 102. The matching server 102 may include a central processing unit (CPU) 302, a main memory 304, a disk drive 306, a removable medium drive 308, and one or more network interface cards (NICs) 310 that are interconnected by a system bus 312. The main memory 304 may store a plurality of programs, libraries or modules, such as an operating system 314, and one or more applications running on top of the operating system 314. The removable medium drive 308 is configured to accept and read a computer readable medium 318, such as a CD, DVD, floppy disk, solid state drive, tape, flash memory or other medium. The removable medium drive 308 may further be configured to write to the computer readable medium 318.

The matching server 102 also may include and/or be accessible by another device, such as an administrator console, having a user input/output (I/O) 320. The user I/O 320 may include a keyboard 322, a mouse 324 (or other pointing device), and a display 326. It should be understood that other or additional user I/O may be provided, such as a touch screen, a touch pad, etc. It should be understood that servers 101 and 103 may include similar components.

Suitable servers include the ProLiant and Integrity series of servers from Hewlett Packard Co. of Palo Alto, Calif., and the PowerEdge series of servers from Dell Inc. of Round Rock, Tex., among others.

Suitable processors may include single processor architectures, dual or quad core processor architectures, microprocessors, etc., or various combinations thereof.

Suitable operating systems 314 include the Windows series of operating systems from Microsoft Corp. of Redmond, Wash., the Linux operating system, the MAC OS® series of operating systems from Apple Inc., and the UNIX® series of operating systems, among others.

The matching server 102 may host one or more matching applications, referred to generally as matching system 316, which may run on top of the operating system 314. In an embodiment, a first matching server, e.g., server 101, may host a web application, a second server, e.g., server 102, may host a database application, and a third server, e.g., server 103, may host a matching application. The combination of these applications may constitute the matching service 316.

Those skilled in the art will understand that the matching server 102 of FIG. 3 is meant for illustrative purposes only and that the present invention may be used with other computer systems, data processing systems or computational devices.

It should be understood that the clients 106, 110 and 114 of FIG. 1 may include similar hardware components as illustrated in FIG. 3 for the matching server 102. Suitable client devices include personal computers (PCs), workstations, laptops, palm computers and other portable computing devices, smart phones, electronic readers (e-readers) etc.

Figure 4:
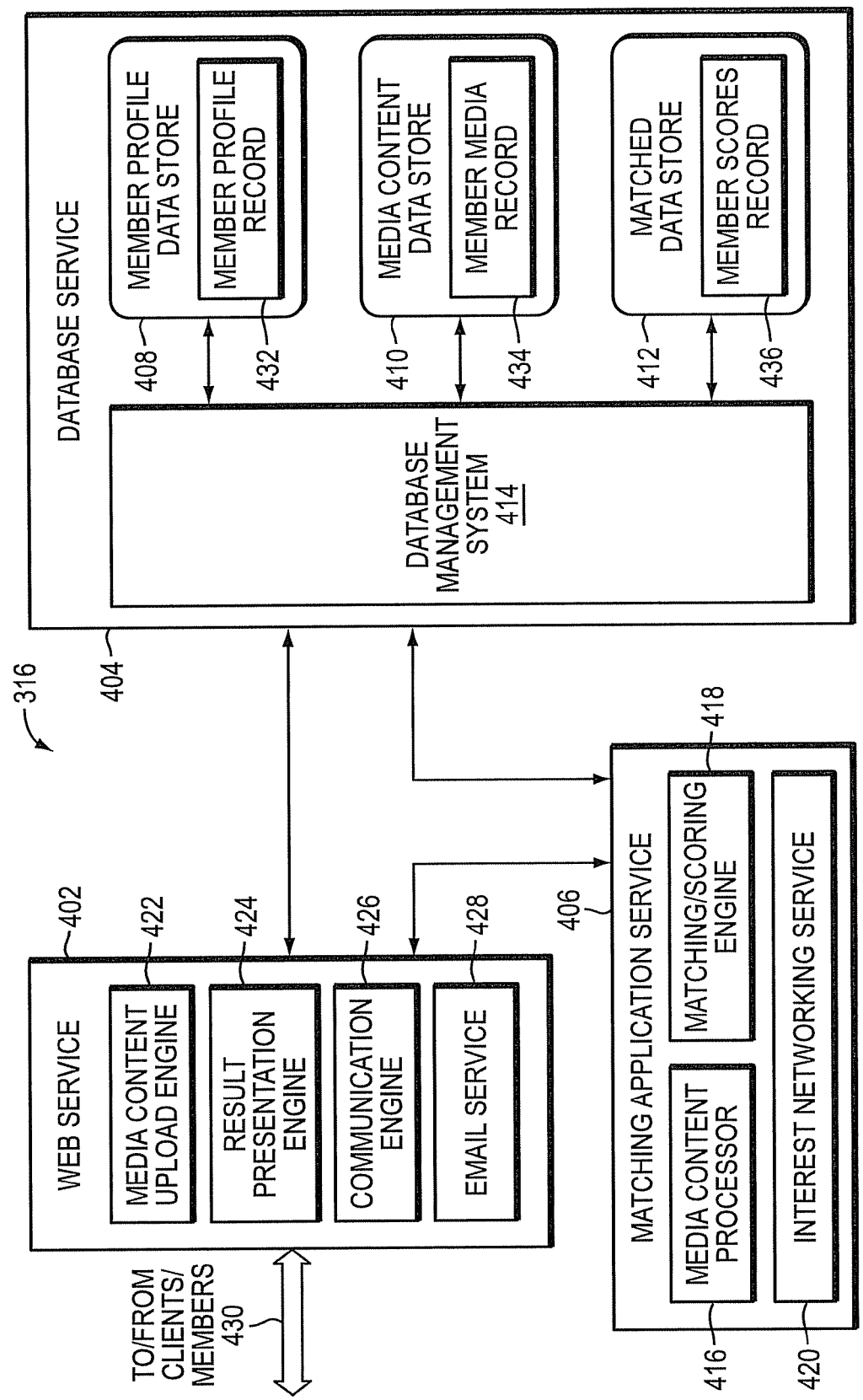
FIG. 4 is a functional block diagram of a matching system in accordance with an embodiment of the present invention.

FIG. 4 is a schematic, functional illustration of the matching system 316, which may be implemented by three applications distributed across the three servers 101-103.

In particular, as indicated above, the matching system 316 may include a web application or service 402, which may run on server 101, a database application or service 404, which may run on server 102, and a matching application or service 406, which may run on server 103. The database service 404 may include or have access to one or more databases, such as a member profile data store 408, a media content data store 410 and a matched data store 412. The database service 404 also may include one or more database management systems (DBMSs), such as DBMS 414. The matching application 406 may include a media content processor 416, a matching or scoring engine 418, and an interest networking service 418.

The web service 402 may include a plurality of components, such as a media content upload engine 422, a result presentation engine 424, a communication engine 426, and an email service 428. One or more users or customers may access the web-based facility 406, e.g., through respective client data processing devices, as indicated by arrow 430. The web service 402 provides functionality and services of a web server program, such as accepting Hyper Text Transport Protocol (HTTP) requests from clients, and providing or serving HTTP responses to those clients.

Suitable web server programs for use with the present invention include Apache from the Apache Software Foundation, and Internet Information Services (IIS) from Microsoft Corp., among others.

As described herein, in an embodiment, users or customers become members of the interest networking service 420 hosted by server 103. For each member, a member profile record 432 and a member media record 434 may be created and saved at the member profile data store 408 and the media content data store 410, respectively. In addition, one or more member scores records, such as record 436, may be created and saved at the matched data store 412, for each member.

It should be understood that the functionality of the matching system 316 may be implemented in other ways. For example, the functionality may be further distributed and/or duplicated across an even greater number of electronic servers, such as in a server farm arrangement, it may be implemented through a grid or cloud computing arrangement, it may be implemented on a single, e.g., powerful, server, etc.

The web service 402, the database service 404, and the application service 406 may communicate and interact with each other by issuing one or more Remote Procedure Calls (RPCs), if they are hosted on separate servers, or through one or more Local Procedure Calls (LPCs), to the extent they are implemented on a single server.

The web service 402, database service 404 and matching application 406 may each comprise registers and combinational logic configured and arranged to produce sequential logic circuits. In an embodiment, the web service 402, database service 404 and matching application 406 are or include software modules or libraries containing program instructions pertaining to the methods described herein, that may be stored on computer readable media, such as computer readable medium 318, and executable by one or more processing elements, such as CPU 302. Other computer readable media may also be used to store and execute these program instructions. In alternative embodiments, various combinations of software and hardware, including firmware, may be utilized to implement the present invention.

Figure 5A:
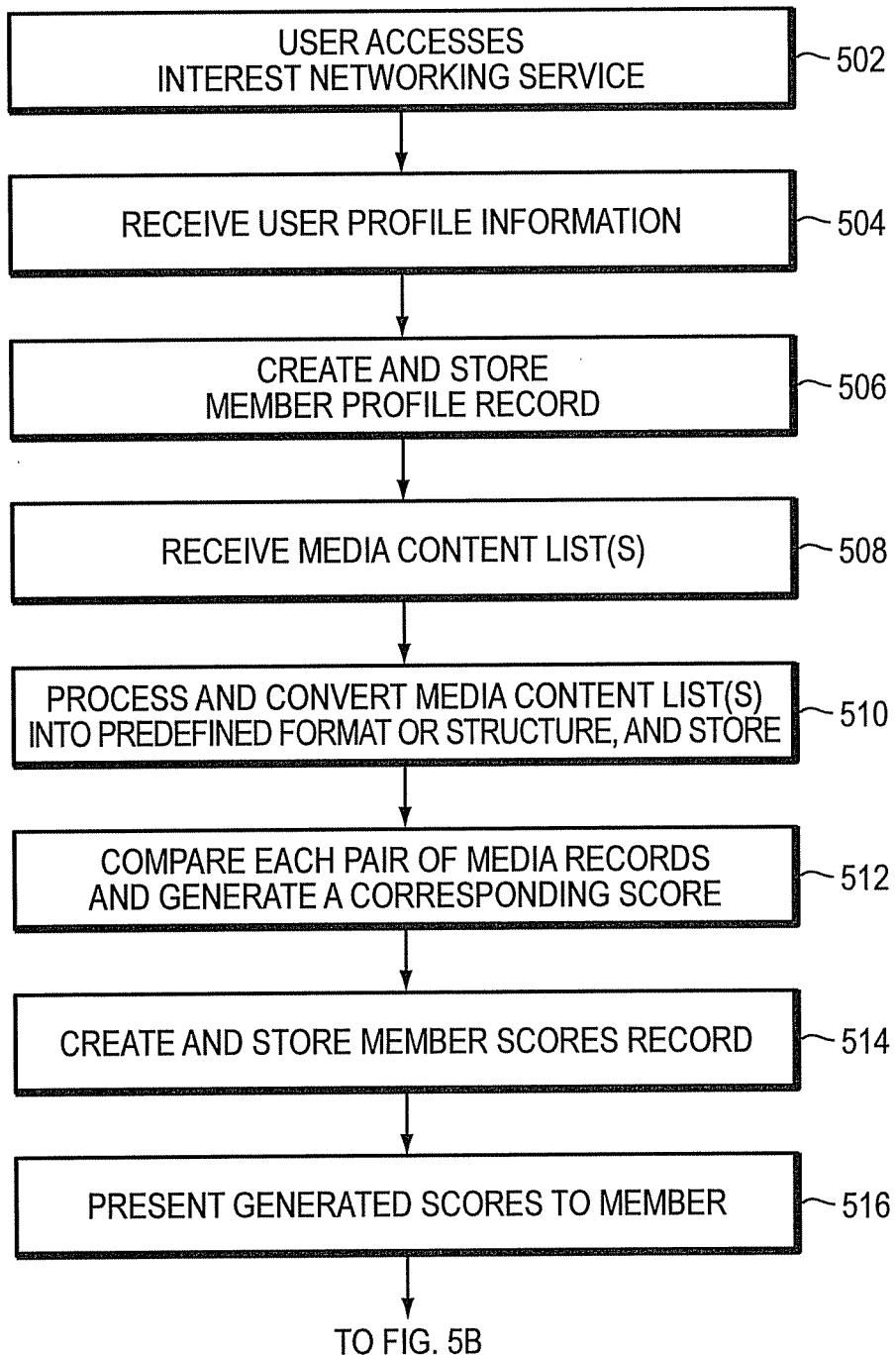
FIGS. 5A-C are flow diagrams of a method in accordance with an embodiment of the present invention.
Figure 5B:
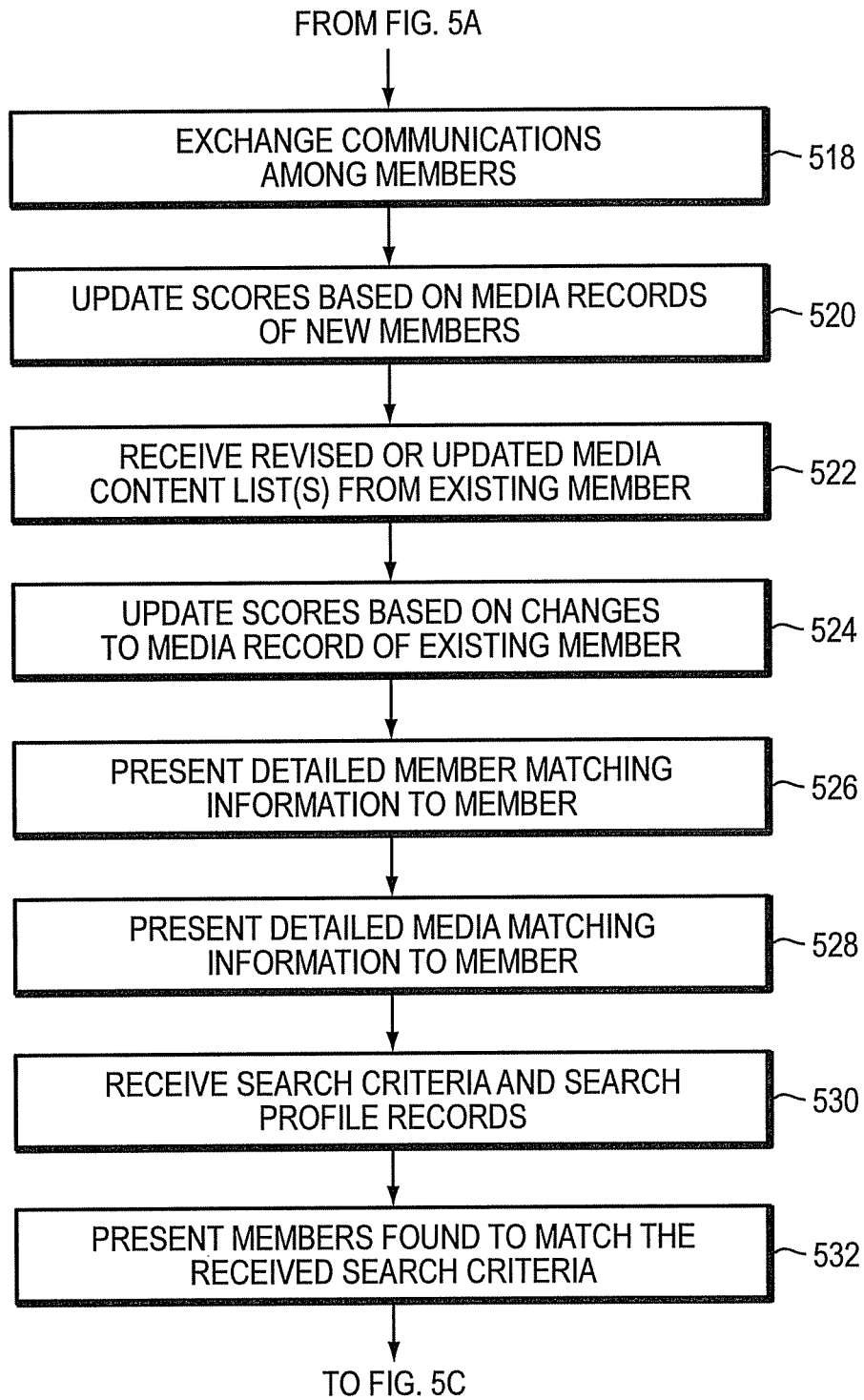
Figure 5C:
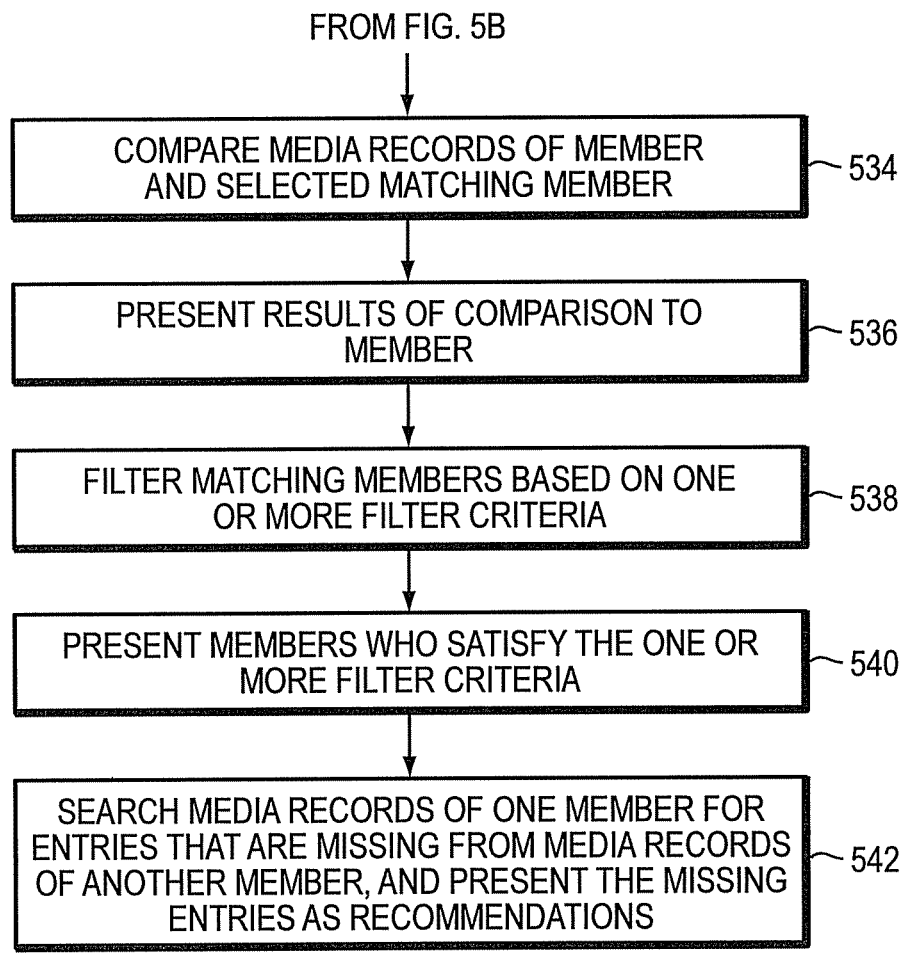

FIGS. 5A-C are a flow diagram of a method in accordance with an embodiment of the present invention. A user or customer, such as a person who is interested in finding other people who share similar tastes or interests in music, movies, videos, books, etc., may access the web-based facility 406 in order to upload his or her media content list, as indicated at block 502. In particular, from a client machine, such as the laptop computer 108, the user may utilize a web browser application to access a web site hosted by the web service 402. That is, the user may enter a domain name associated with that web site into the browser application, and thus establish a communication link between the client, e.g., laptop computer 108 and the server 101. In response, the media content upload engine 422 of the web service 402 may present an interactive webpage to the user for display on the user's laptop computer 108, i.e., the client.

In an embodiment, the media content upload engine 422 of the web service 402 may present the user with a login page, requesting that the user become a member of the interest networking service 420 hosted by server 103. To join the interest networking service 420, the user may select a username and password. Once the user has created a username and password, and has logged in to the website hosted by the web service 402, the media content upload engine 422 may present a form to the user for gathering profile information about the user, such as his or her name, address, age, occupation, etc. The user may enter this information into the form. The media content upload engine 422 may capture the information entered by the user in the form, e.g., name, address, age, occupation, etc., and create a member profile record 432, as indicated at block 504. The media upload engine 414 may pass the member profile record 432 to the DBMS 414 for storage in the member profile data store 408, as indicated at block 506.

FIG. 6 is a schematic illustration of an exemplary member profile record 432. The member profile record 432 may include a plurality of fields or cells, each configured to hold, e.g., store, information. In particular, the member profile record 432 may include a username field 602, a password field 604, an email field 606, a full name field 608, an address field 610, a telephone number (no.) field 612, an age field 614, an occupation field 616, a payment information field 618, and a link to media record field 620. The username and password fields 602, 206 contain the username and password established for the member. The email, full name, address, telephone no., age and occupation fields 606-616 contain the identified information of the member as entered in the profile form. The payment information field 618 may contain credit or debit card information or other payment information. The link to media record field 620 contains a link, such as a pointer, to the media record 434 for this member.

Those skilled in the art will understand that the member profile record 432 may include additional or other information, such as the sex of the member, or have other structures or formats.

Next, the media content upload engine 422 may upload and receive information about the member's media library, as indicated at block 508. In particular, the media content upload engine 422 may obtain a copy of the member's media content list 206, including any playlists 208. In an embodiment, the media content upload engine 422 may present a set of instructions to the member for uploading his or her media content list 206 to the matching server 102.

In an embodiment, the instructions may direct the member to utilize a built-in 'export' command or feature of the media player application 118. For example, for the iTunes application, the instructions may direct the member to utilize the File→Library→Export Library sequence to create an eXtensible Mark-up Language (XML) file called 'Library'. The 'Library' file created by the media player application may then be stored at a selected location on the client device, e.g., on the Desktop. Depending on the size of the file, the member also may be instructed (or may choose) to compress the file, e.g., utilizing a zip program or utility, before transferring it to the matching server 102.

The member may then be instructed to locate and upload the just created 'Library' file to the matching system 316. For example, the media content upload engine 422 may present a dialog box to the member that provides a browse feature that the member may manipulate, e.g., with the mouse 324 or keyboard 322, to locate the 'Library' file stored on his or her client data processing device, such as the laptop computer 106. The media content upload engine 422 may also present an 'Upload' command button to the user. Upon selection of the 'Upload' command button by the user, e.g., with the mouse 324, the media content upload engine 422 may transfer a copy of the 'Library' file from the client, e.g., the laptop computer 106, to the web service at server 101, which may forward it to the database application 404 at server 102 for storage.

It should be understood that the client's media content list 208 may be transferred to the matching system 316 in other ways. For example, the media content upload engine 422 may download and install a helper application onto the client device, e.g., the laptop computer 106. The helper application may be configured to search for, compress and transfer the client's 'iTunes Music Library.xml' file to the matching system 316 automatically, i.e., without any involvement from the user. The member also may be directed to utilize a third-party application, such as the 'Media Info Exporter' program from Microsoft Corp. This program is designed to export information regarding a Windows Media Player library into a selected file type, such as a Microsoft Word or Excel file, a Hyper Text Transport Protocol (HTTP) file, or an XML file.

In another embodiment, the member may be directed to select and transfer one or more pre-existing files to the matching server 102. As indicated above, the iTunes application, for example, creates and stores an eXtensible Mark-up Language (XML) file called 'iTunes Music Library.xml' that contains information about the contents of the iTunes media library. In particular, the 'iTunes Music Library.xml' file includes information such as song title, artist name, album title, genre, track number, etc. The media content upload engine 422 may present a dialog box to the user that provides a browse feature that the user may manipulate, e.g., with the mouse 324 or keyboard 322, to locate the 'iTunes Music Library.xml' file stored on his or her client data processing device, such as the laptop computer 106. In a Windows-based computer, the 'iTunes Music Library.xml' file may be found at My Documents/My Music/iTunes/. In a MAC-based computer, the 'iTunes Music Library' file may be found at Mac Music/iTunes/.

Once the user locates and selects his or her 'iTunes Music Library.xml' file, the media content upload engine 422 may present an 'Upload' command button to the user. Upon selection of the 'Upload' command button by the user, e.g., with the mouse 324, the media content upload engine 422 may transfer a copy of the 'iTunes Music Library.xml' file from the client, e.g., the laptop computer 106, to the matching system 316. Depending on the size of the XML file, the media content upload engine 422 may compress the customer's 'iTunes Music Library.xml' file before transferring it to the matching server 102.

In an embodiment, the actual digital media files 204 are not transferred to the matching system 316. Instead, only the media content list 206, which is essentially a listing, index or table of contents, is sent to the matching system 316. Nonetheless, it should be understood that, in other embodiments, the media files 204 either alone or together with the media content list 206 may be transferred and analyzed by the matching system 316.

It should be understood that the client device need not include a media player application. For example, the client device may simply include a media content list 206, that lists the member's music and/or other media. The media content list 206, moreover, may include or be limited to a list of books or other items purchased by member, such as a list of books purchased from an online book store, such as www.amazon.com, or a list of movies or other media rented by the member from an online rental service, such as www.netflix.com. Those skilled in the art will understood that other such lists may be used.

The media content processor 416 may analyze and convert the received media content list 206 into a format suitable for further processing by the matching system 316, as indicated at block 510. Because there is no standard form of a media content list, the lists or data files generated by the various media player applications have different formats and structures. The media content processor 416 may first determine the type of media content list received from the user. That is, the media content processor 416 may determine whether the media content list 206 is a 'Library' XML file created by the iTunes application, an MS Word or Excel file created by the Media Info Export program, or some other file type or format.

The media content processor 416 may then extract selected information from the received media content list, and create a data structure having a predefined format or structure, as also indicated at block 510. In particular, the media content processor 416 may create a member media record 434 for each member based on the information contained in the member's media content list. In an embodiment, the media content processor 416 may extract all of the Artists' names from the member's media content list 206, and place the Artists' names in the member media record 434 for that member. The media content processor 416 may also convert the Artists' name information as extracted from the received media content list into a predefined format for storage in the member media record 434 and analysis by the matching/scoring engine 418, such as listing the artist's first name followed by last name.

FIG. 7 is a schematic illustration of a member media record 434. The member media record 434 may be organized into a plurality of sections, where each section corresponds to a different category or type of media file. In particular, the member media record 434 may include a music files section 702, a movie files section 704, a television program files section 706, an other video files section 708, and an audiobook files section 710. Each section 702-710, moreover, may be organized as a table or array having a plurality of rows and columns whose intersections define cells for storing information.

Specifically, the music files section 702 may include a song title column 712, a composer name column 714, a performer name column 716, a genre column 718, an album name column 720, a track number (no.) column 722, a user rating column 721, and a play count column 723. The movie files section 704 may include a movie title column 724, a director column 726, one or more actors and/or actresses columns 728, a genre column 730, and a last played column 731. The television program files section 706 may include a program title column 732, a program series column 734, one or more actors and/or actresses columns 736, and a genre column 738. The other video files section 708 may include a title column 740 and a creator column 741. The audiobooks section 710 may include a title column 742, an author column 744, and a genre column 746.

Those skilled in the art will understand that the member media record 434 may include additional or other information, or have other formats or structures. For example, the member media record 434 may be stored as one or more XML files. Furthermore, the music files section 702 may include a field that indicates how many playlists a particular song appears in, such as a playlist count column, as well as its own 'last played' column, among others.

The matching/scoring engine 418 may access the member media records 434 saved in the media content store 410, and analyze each pair of member media records 434 to generate a score for each pair of records, as indicated at block 512. In particular, the matching/scoring engine 418 may configured to execute one or more algorithms that receive two member media records 434 as inputs, and outputs a score, e.g., a value. As described herein, the score generated for a given pair of media records 434 represents the degree of similarity between the content contained in the two media records 434. In an embodiment, the scores may be determined based on the number of common song titles, album titles, artist names, performers, and genres between the two member media records 434 being evaluated. In a further embodiment, the matching/scoring engine 418 may consider information obtained from the playlists. For example, the matching/scoring engine 418 may give greater weight to songs that appear in a member's playlists as opposed to songs that simply appear in the member's media library. Similarly, songs having a high play count, or a play count that meets or exceeds a predetermined threshold, may be given greater weight by the matching/scoring engine 418.

A suitable algorithm for generating a score is:

Final Score=Score*normalizing factor, where,

Score=Genre(x,y)*Genre(weighting)+Titles(x,y)*Title(weighting)+ArtistName(x,y)*ArtistName(weighting)+AlbumName(x,y)*AlbumName(weighting), and normalizing factor=(1/total number of media entries of x)*(1/total number of media entries of y)

The term Genre(x,y) indicates the number of common genres between the two members x and y. The term Genre (weighting) refers to a settable weighting factor to be applied to the genre category. The weighting factor is preferably a value between 0 and 1.0. The term titles(x,y) refers to the number of common song, movie, television series, video, and book titles between the two members x and y. The term Titles(weighting) refers to a settable weighting factor to be applied to the titles category. The term ArtistName(x,y) refers to the number of common artist names between the two members x and y. The term ArtistName(weighting) refers to a settable weighting factor to be applied to the artists name category. The term AlbumName(x,y) refers to the number of common album names between the two members x and y. The term AlbumName(weighting) refers to a settable weighting fact to be applied to the album name category.

For example, suppose the weighting factors for genre, title, artist and album are 0.75, 0.85, 0.75 and 0.60, respectively. Suppose also that member "x" has the following playable units in his media library:

| Song Title | Artist Name | Album Name | Genre |
|---|---|---|---|
| More than a Feeling | Boston | Discover Boston | Classic Rock |
| Rooster | Alice in Chains | Unplugged | Alternative Rock |
| Don't Fear the Reaper | Blue Oyster Cult | Agents of Fortune | Classic Rock |
| You're So Vain | Carly Simon | Clouds in My Coffee | Soft Rock |

Suppose further that member "y" has the following playable units in her media library:

| Song Title | Artist Name | Album Name | Genre |
|---|---|---|---|
| Burnin' for You | Blue Oyster Cult | Fire of Unknown Origin | Classic Rock |
| You're So Vain | Carly Simon | Clouds in My Coffee | Soft Rock |
| Lowdown | Boz Scaggs | Hits! | Soft Rock |

In this case, there are two common genres, i.e., classic rock and soft rock, so the value for the genre element is '2'. There is also one common title, i.e., You're so Vain, so the value for the songs element is '1'. There are two common artists, i.e., Blue Oyster Cult and Carly Simon, so the value for the artists element is '2'. There is also one common album, i.e., Clouds in my Coffee, so the value for the album element is '1'.

Accordingly, the above exemplary algorithm would yield the following:

Score=2*(0.75)+1*(0.85)+2*(0.75)+1*(0.60)=4.45 normalizing factor=(¼)*(⅓)=0.0833

Total score=4.45−0.8333=0.371

It should be understood that the foregoing is meant for illustrative purposes only, and that in most cases member's libraries will contain far more playable units.

In an embodiment, the algorithm utilized by the matching/scoring engine 418 generates a score between zero and 1000 for each pair of member media records 424 being analyzed, with zero representing nothing in common, and 1000 representing two identical libraries.

It should be understood that other or different algorithms may be advantageously utilized. For example, the algorithm may account for the ratings that a member places on particular playable units. For example, the algorithm may give significant weight where two members rate the same song by the same artist or performer highly, e.g., with five stars. The algorithm may also consider the last time a particular playable unit was played back by the member, if this information is available. For example, if a song in a member's library has not been played by the member for over a year, or some other time threshold, it may be assigned little weight, or possibly no weight, by the algorithm. Similarly, a song that has been played back over 25 times may be assigned a higher weight.

In another embodiment, the matching/scoring engine 418 may apply a different algorithm to each category of media, e.g., music, movies, video, audiobooks etc. Similarly, the matching/scoring engine 418 may generate a different match score for each category. That is, two members may have a match score of 925 for music, 512 for movies, and 285 for audiobooks.

In yet another embodiment, the matching/scoring engine 418 may include one or more optimization techniques. For example, the matching/scoring engine 418 may first determine whether the two member media records 424 being analyzed have any common music genres, e.g., rock, pop, classical, jazz. If there are no common musical genres between the two member media records 424, the matching/scoring engine 418 may stop its analysis without producing a score, as the two member media records 424 are likely to be very different.

In an embodiment, the media content processor 416 may replace text strings from a member's media content list with numeric values to improve processing by the matching/scoring engine 418. The numeric values may be predetermined. For example, each artist name may be assigned a unique numeric value, and this numeric value may be stored in the member media record 434 in place of the text-based artist's name. Such numeric values may also be used for genre, song title, album name, audiobook title, etc.

For each member, the scores produced by the matching/scoring engine 418 by comparing the member's media record 434 with the media records 434 for every other member may be organized into a member scores record 436, and saved in the matched data store 412, as indicated at block 514.

FIG. 8 is a schematic illustration of a member scores record 436. The member scores record 436 may be organized as a table or array having a plurality of rows and columns whose intersections define cells for storing information. In particular, the member scores record 436 may include a member username column 802, a score column 804, and a link to member profile record column 806. Record 436 may also include rows 808a-f. Each row, e.g., row 808c, corresponds to another member, e.g., Wanderbird, whose member media record 434 was compared to the current member's media record, thereby generating a score, e.g., 679.

The result presentation engine 424 of the web-based facility 406 may access the member scores record 436 generated for a given member from the matched data store 404, and transmit one or more of these scores to the customer-client for presentation, as indicated at block 516. In an embodiment, the result presentation engine 424 of the web service 402 generates and updates a webpage that presents this information to the member, e.g., by transmitting the webpage to a client device for presentation on the display 326 of the client data processing device, such as in his or her web browser application.

Figure 9:
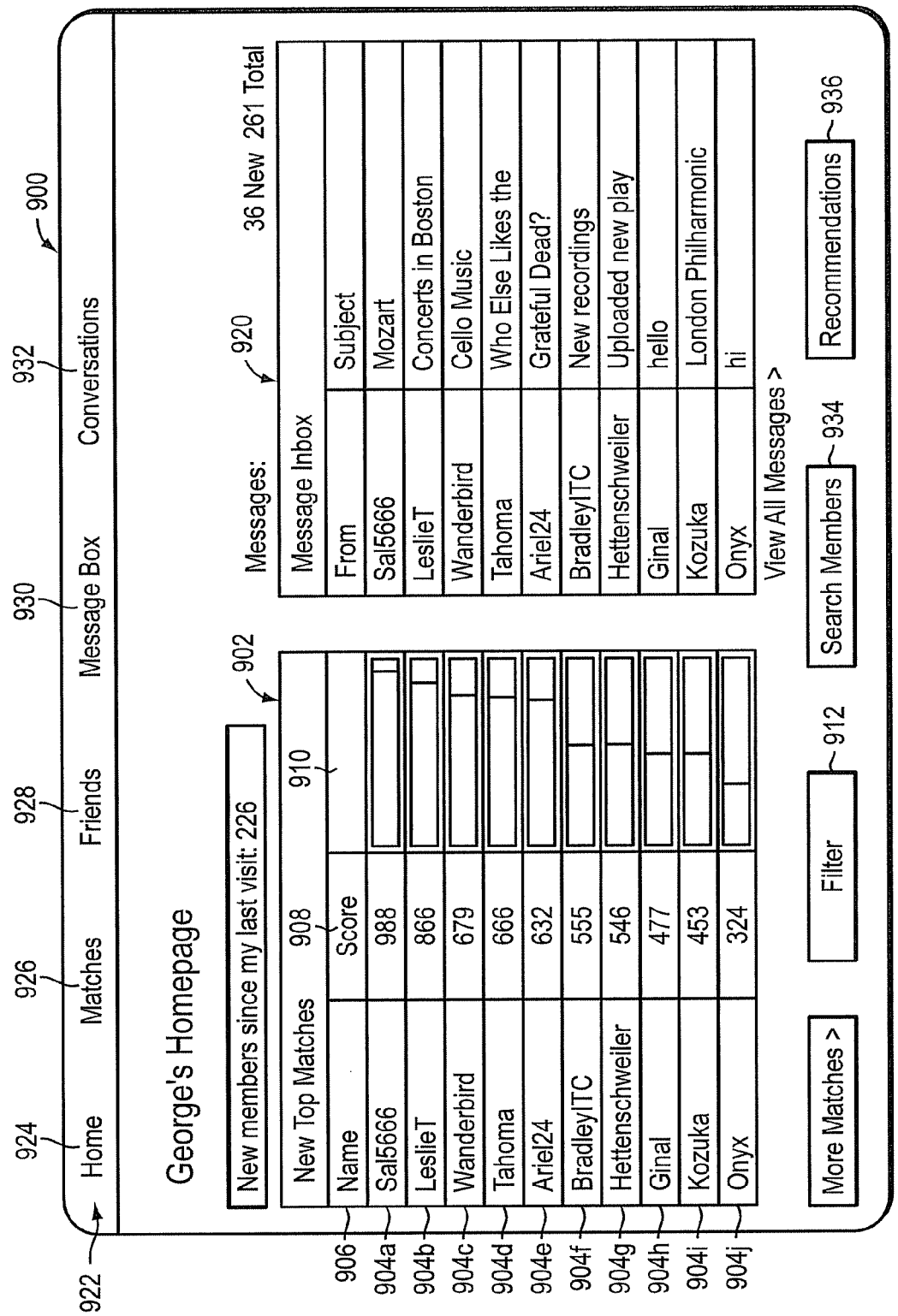
FIGS. 9-12 are schematic illustrations of webpages in accordance with embodiments of the present invention.

FIG. 9 is a schematic illustration of an exemplary presentation or home webpage 900. The presentation webpage 900 may include a top matches pane 902. The top matches pane 902 may be organized as a list having a plurality of rows, such as rows 904a-j, where each row corresponds to another member that was matched to the logged in or viewing member. Each row 904, moreover, may include a plurality of fields, such as a name field 906, a score field 908, and a bar graph field 910. The name field of a row, such as row 904b, contains the username of the respective other member, i.e., Leslie T. The score field of a row, such as row 904b, contains the matching score, i.e., 866, generated by the matching/scoring engine 418 based on a comparison of the media record for the logged in or viewing member and the media record 434 corresponding to the other identified member, i.e., Leslie T. The bar chart field 910 of a row presents the score value in a bar chart format to aid the logged in or viewing member in determining the degree or extent to which there are matches with other members.

It should be understood that the score information may be presented in other ways. For example, the matching scores may be presented to the user through one or more lists, charts, graphics, animation or other forms. In addition, rather than (or in addition to) generating a presentation webpage 902, the result presentation engine 424 may generate a notification, such as one or more email, text or voicemail messages, for transmission to the member, once the matching/scoring engine 418 has completed its processing and has produced a set of scores for the member. The notification, e.g., the email message, may be transmitted to the member, i.e., to the member's client machine, by the communication engine 426. In response to the one or more email messages, the member may access the web service 402, log in, and receive the scores from the result presentation engine 424.

As shown, the presentation webpage 900 provides the logged in or viewing member with the identity of a number of other members with whom the logged in member shares similar tastes or interests in music, movies, books, etc. In an embodiment, the logged in or viewing member may contact any of the members presented in the top matches pane 902, as indicated at block 518 (FIG. 5B). In particular, the username information contained in the name field 906 of the top matches pane 902 may be selectable by the logged in member. That is, each username displayed in the top matches pane 902 may be a hyperlink. Upon selecting a desired username from the top matches pane 902, the logged in member may be presented with a dialog box (not shown) that presents the logged in member with one or more selectable commands. One of the selectable commands may be "Email member". Upon selecting the "Email member" command, the email service 428 may present an email message generation screen to the logged in member. The email message generation screen may be populated with the email address of the other member selected by the logged in member (which may or may not be viewable), and it may further include an area in which the logged in member may create a message, e.g., with the keyboard 322 and/or mouse 324. The email message generation screen may also include a "Send" command. In response to the logged in member selecting the Send command, the email service 428 in cooperation with the communication engine 426 may transmit a corresponding email message to the selected other member. Email messages may be displayed in a message pane 920 of the presentation webpage 900.

In an embodiment, the matching/scoring engine 418 may be configured to update the information in the top matches pane 902 each time the member logs in to the matching server 102, as indicated at block 520. That is, when a member logs in, the matching scoring engine 410 may scan the media content data store 402, and determine which new members have been added to the matching server since the last time this member logged in. The matching scoring engine 410 may then run its scoring analysis on these new members and update the member scores record for the logged in member. In this way, each time a member logs in to the matching server 102, new match information may be presented in the top matches pane 902 for the logged in member.

In addition to presenting an "Email member" command, the dialog box may also include a "Go to Member's Home Page" command button. In particular, each member of the interest networking service 420 may create a customized home page. This home page may be hosted by the web service 402 and/or the interest networking service 420. A user may include additional information about himself or herself on the home page, such as photographs, a list of interests or hobbies, address, etc. By viewing a member's home page, the logged in or viewing member may learn additional information about that member. Alternatively or additionally, the member may provide a link to a social networking site or webpage created by the member, such as a www.facebook.com or www.myspace.com webpage.

The matching/scoring engine 418 may also generate new scores in response to changes made to a member's media record. For example, upon logging in, a member may report to the media content upload engine 422 that there have been changes to the member's media library 202. For example, the member may have added a new album, movie or television series to his or her media library 202, or created several new playlists from the existing media files 204. In response, the media content upload engine 422 may direct the user to resend his or her updated media content list 206 to the matching server 102, as described above. As a result, the media content upload engine 422 receives a copy of the member's updated media content list 206, including any playlists 208, as indicated at block 522. The matching system 316 may then generate a new series of scores based on the revised or updated media content list 206 received from the member, as indicated at block 524. That is, the matching system 316 may process the revised media record as described above in connection with blocks 504-516.

It should be understood that members of the interest networking service 420 hosted by server 103 whose media files closely match other members may form groups. For example, suppose a number of members discover that they all share an interest in Mozart operas. These members may form a group where they can share information, such as upcoming performances, new CD or DVD releases, etc. The interest networking service 420 may maintain the groups created by members.

In an embodiment, the result presentation engine 424 may be configured to present one or more category scores in addition to or instead of presenting a total score. Specifically, with reference to FIG. 9, the homepage 900 may include a command bar 922 having a plurality of commands, such as a Home command 924, a Matches command 926, a Friends command 928, a Message Box command 930 and a Conversations command 932. In response to a user, e.g., the logged in member, selecting the Matches command 926, e.g., with the mouse 324, the result presentation engine 424 may generate and present a Matches webpage, as indicated at block 526.

Figure 10:
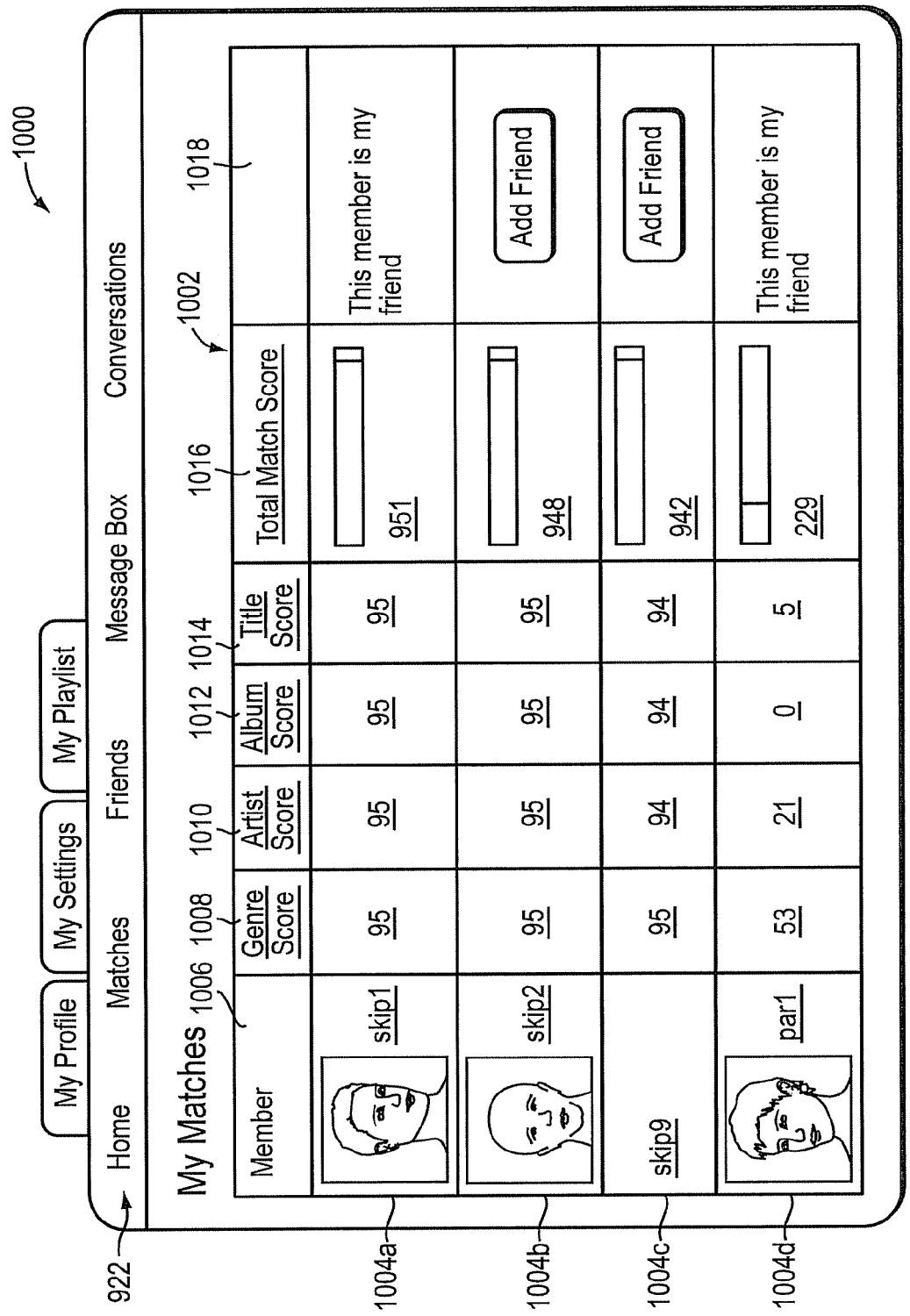

FIG. 10 is an illustrative embodiment of a Matches webpage 1000 generated by the result presentation engine 424 for presentation to a user, e.g., by transmitting the webpage to a client device for display, e.g., in his or her web browser application. The Matches webpage 1000 provides detailed information regarding some or all of the members that have been matched to the logged in member, such as through a matches table or array 1002 having a plurality of rows and columns. In particular, the matches table 1002 may have a plurality of rows 1004*a-d*, and each row may correspond to a member that has been matched to the logged in member. Matches table 1002 may also have a plurality of columns, such as a Member name column 1006, a Genre Score column 1008, an Artist Score column 1010, an Album Score column 1012, a Title Score column 1014, a Total Match Score column 1016, and a Friend Status column 1018. For a given member, such as "skip1", represented by a row, such as row 1004*a*, the cell corresponding to the Member name column 1006 contains the member's username, e.g., 'skip1'. The cell corresponding to the Genre Score column 1008 contains the matching genre score, e.g., 95, generated by the matching/scoring engine 418 for the logged in member and the member represented at row 1004*a*, e.g., 'skip1'. Similarly, the cells corresponding to the Artist Score column 1010, the Album Score column 1012, and the Title Score column 1014 contain the matching artist score, the matching album score and the matching title score, which in this example are all 95. The cell corresponding to the Total Match Score column 1016 contains the total match score, e.g., 951, for the logged in member and the member, e.g., 'skip1', corresponding to the respective row, e.g., row 1004*a*. The cell corresponding to the Friend Status column 1018 contains information indicating whether the respective member is a friend of the logged in member.

Members who have exchanged communications, emails or otherwise, may be considered Friends. Friend status can also be established by invitation.

As illustrated, the Matches webpage 1000 provides additional information to the logged in member regarding the underlying category scores that were generated by the matching/scoring engine 418 for the logged in member and one or more other members. The Matches webpage 1000 may contain such additional information for all of the other members that were deemed a match to the logged in member, e.g., whose total score exceeds some threshold, or one or more other members as selected by the logged in member.

The result presentation engine 424 may be configured to provide additional information, such as detailed or specific media matching information, between a logged in member and another member. More specifically, in response to a user selecting a particular member from the Matches webpage 1000, the result presentation engine 424 may generate and transmit for presentation to the logged in member, a Detailed Media Matching Information webpage. The logged in member may select a particular member from the Matches webpage 1000 by selecting the total match score value for the particular member as contained in the cell corresponding to the Total Match Score column 1016. For example, in response to the logged in member selecting the total match score for member 'skip1', i.e., 951, which may represent a command or hyperlink, the result presentation engine 424 may be configured to generate a Media Matching Information webpage between the logged in member and the selected member, e.g., 'skip1', as indicated at block 528.

Figure 11:
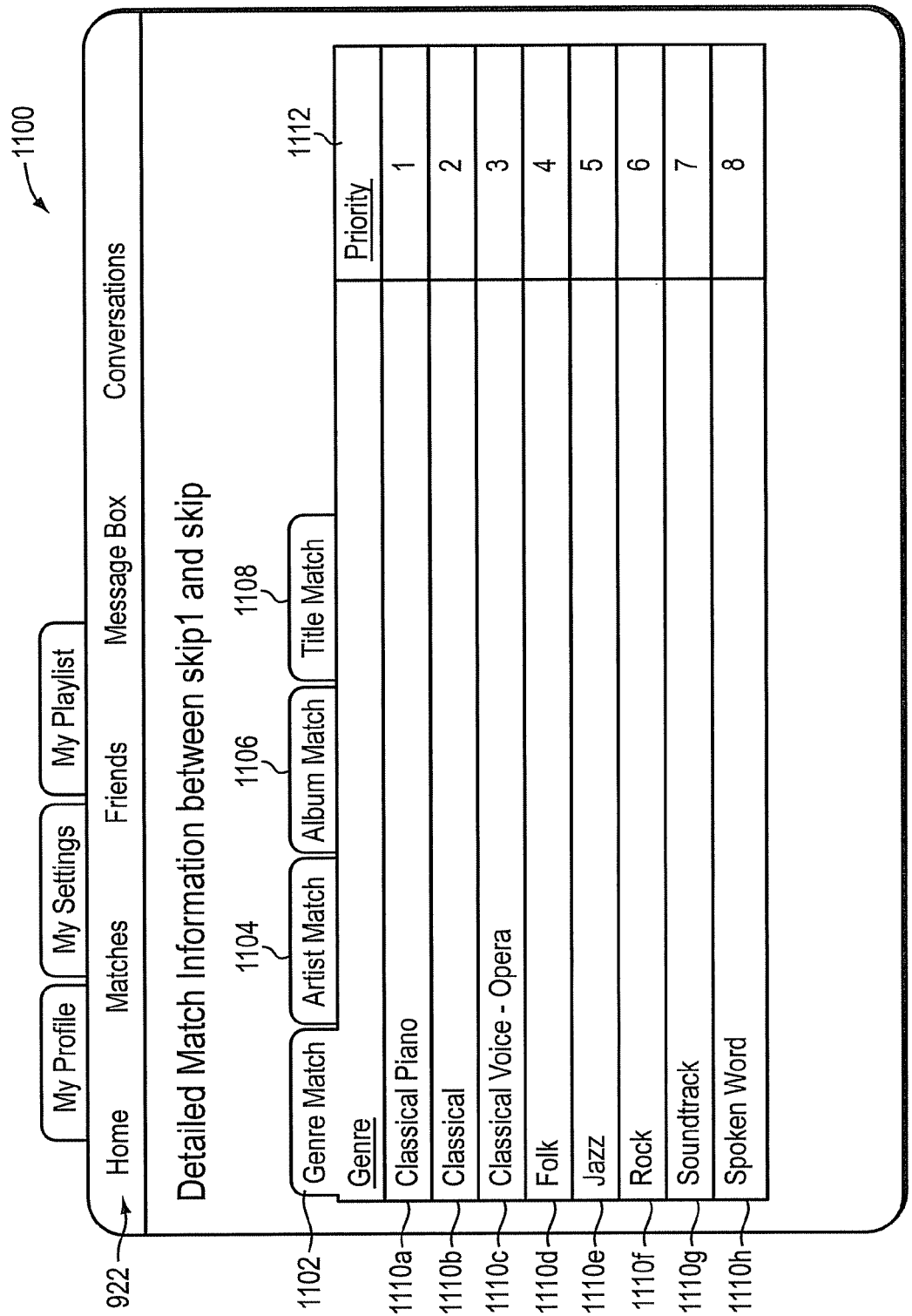

FIG. 11 is an illustrative embodiment of a Media Matching Information webpage 1100 generated by the result presentation engine 424 for transmission to the logged in member for display, e.g., in his or her web browser application. The Media Matching Information webpage 1100 may include a plurality of tabbed, overlapping information panes, including a Genre Match tabbed pane 1102, an Artist Match tabbed pane 1104, an Album Match tabbed pane 1106 and a Title Match tabbed pane 1108. In response to the selection of a particular tab, e.g., with the mouse 324, the result presentation engine 424 may cause that tab to be pulled to the front, and thus displayed to the user, e.g., in his or her browser application.

The information contained in the Genre Match pane 1102 may be presented as a table or array having a plurality of rows and columns. Each row 1110a-h corresponds to a particular genre, such as Classical Piano, Classical, Classical Voice—Opera, Folk, Jazz, etc., that was found to match between the logged in member and the selected member. The rows 1110a-h may be presented in descending order of priority. That is, the genres that represent the highest degree of match between the logged in member and the selected member may appear at the top of the list, e.g., rows 1110a-c, and the genres that represent lower degrees of match may appear toward the bottom of the list, e.g., rows 1110f-h. As illustrated in FIG. 11, the logged in member and the selected member illustrated in the Media Matching Information webpage 1100 show a high degree of match for the genres Classical Piano, Classical, and Classical Voice—Opera, and lower degrees of match for such genres as Rock and Soundtrack.

For each listed genre, a priority value may be presented in a priority column 1112. In an embodiment, the priority value may be based upon the number of titles in the media libraries being compared that fall within the same genre. It should be understood that other techniques may be used, such as the number of albums in the libraries being compared that fall within the same genre.

The Artist Match tabbed pane 1104 may present matching artist information in a similar manner as the Genre Match tabbed pane 1102. That is, the Artist Match pane 1104 may provide a list of artist names that match between the logged in member and the selected member. The artist names may be organized in a descending order of degree of match. That is, those artists representing the highest number of matches between the logged in member and the selected member may appear at the top of the list, and the artists having a lower number of matches may appear toward the bottom of the list.

The Album Match tabbed pane 1106 may present an alphabetical list of the albums, e.g., by title, that appear in the libraries of both the logged in member and the selected member. In addition to including the title of the album, the list presented in the Album Match tabbed pane 1106 may include additional information, such as artist name.

Figure 12:
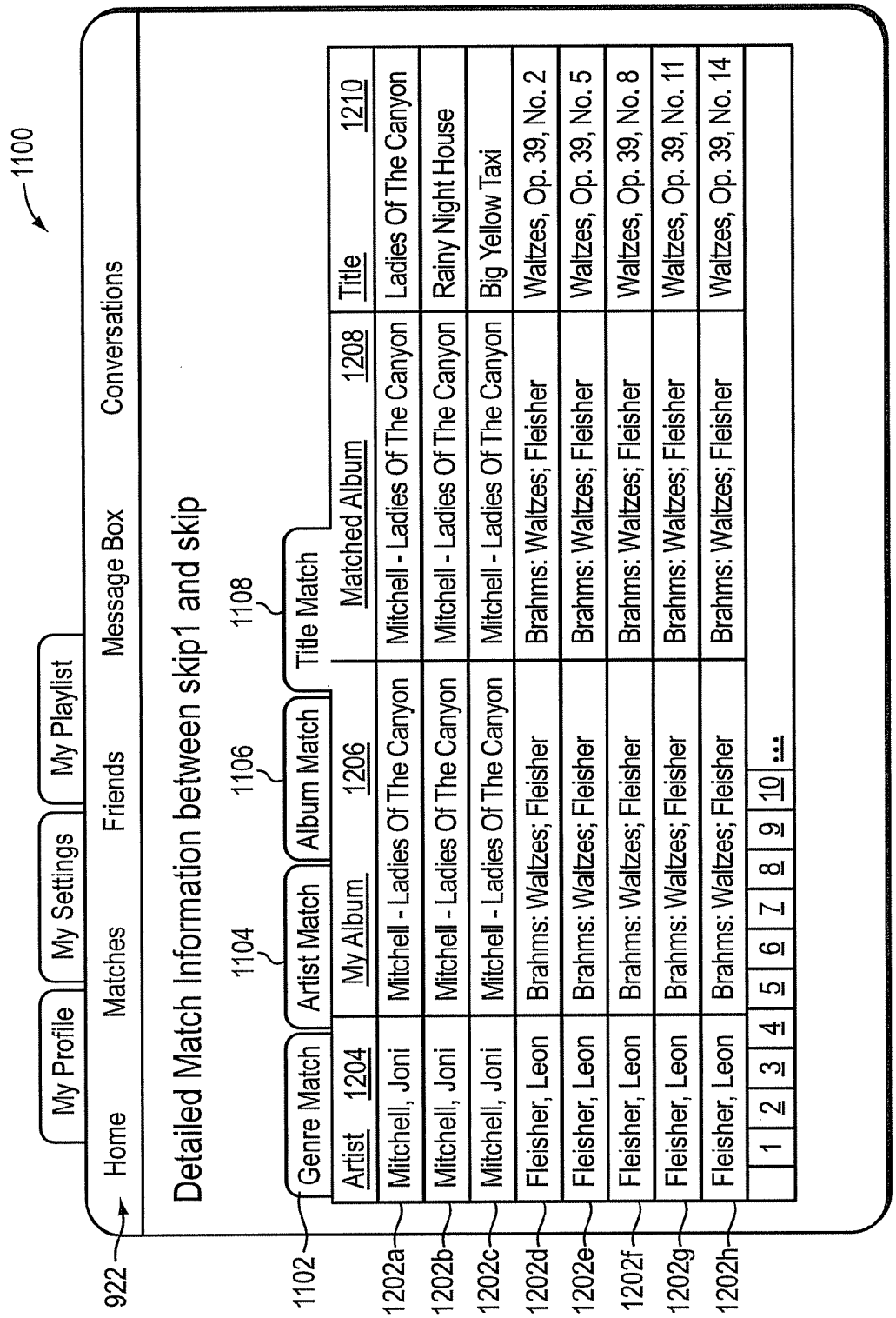

FIG. 12 is an illustrative embodiment of the Title Match pane 1108. The information presented in the Title Match pane 1108 may be organized as a table or array having a plurality of rows 1202a-h, each of which corresponds to a respective song. The table may also include a plurality of columns, such as an Artist column 1204, a My Album column 1206, a Matched Album column 1208, and a Title column 1210. For a given row, e.g., row 1202a, the cell for the Artist column 1204 contains the name, e.g., 'Mitchell, Joni', of the artist. The cell for the My Album column 1206 contains the name of the album, e.g., Mitchell—Ladies of the Canyon, in which the matching song appears as located in the media library of the logged in member. The cell for the Matched Album column 1208 contains the name of the album, e.g., Mitchell—Ladies of the Canyon, in which the matching song appears as located in the media library of the selected member. It should be understood that the same song may be found on different albums.

The cell for the Title column 1210 contains the title, e.g., 'Ladies of the Canyon', of the matching song. To the extent the number of matching songs exceeds what can be show on the Title Match pane 1108, command buttons, such as page number, 'next page'/'previous page', and/or arrow buttons may be provided to present or scroll through additional matching song titles between the logged in member and the other member.

While the foregoing description has been made in terms of music files, it should be understood that additional or other files may be analyzed, such as movies, television shows, etc.

People Matching Process

In an embodiment, the matching system 316 provides services for assisting members of the interest networking service in locating and contacting other members that may be potential matches to the searching member for companionship and/or a relationship. As indicated above, a member may enter personal information about himself or herself in a profile page generated by the web service 402, and this information may be stored in a member profile record 432. A member may designate some or all of this information as searchable or viewable by other members, and this state may be saved, e.g., stored in memory. A searching member may thus conduct searches on other members through their available profile information.

Specifically, a command button or link, such as a Search Members command button 934 (FIG. 9), may be provided on the home page 900. In response to a logged in member selecting the Search Members command button 934, the interest networking service 420 may be configured to generate and transmit a search page, e.g., for display on the logged in member's browser application. The search page (not shown) may allow the logged in member to specify one or more search criteria, such as sex, age, city or location, interests, hobbies, occupation, income, school, etc. For example, a logged in member may specify an age range, such as 25-30 years old, a sex, such as female, and a location, such as San Francisco, Calif. The search page may include a series of check boxes, radio buttons or drop down lists that may be selected, as desired, by the logged in member, e.g., with the mouse and/or keyboard.

The matching/scoring engine 418 receives the logged in member's search criteria, and searches the member profile records 432 for those members whose profile information matches the search criteria specified by the logged in member, as indicated at block 530. That is, the matching/scoring engine 418 identifies those members who are between 25-30 years old, are female and live in the San Francisco area. The members who satisfy the specified search criteria may then be returned to the logged in member, as indicated at block 532. In particular, the result presentation engine 426 may generate and transmit a webpage containing a list of matching members for presentation to the logged in member, e.g., through his or her browser application. The logged in member may contact one or more of the returned members who satisfied the search criteria.

In a further embodiment, the present invention allows a logged in member to obtain additional information about his or her potential compatibility with one or more of the members meeting the specified search criteria. This capability of the matching system 316 helps a logged in member to select which of the returned members to contact. Specifically, in response to a request from the logged in member, the matching/scoring engine 418 may be configured to perform a comparison between the media libraries of the logged in member and one or more of the matching members. That is, suppose twelve matching members are presented to the logged in member. Suppose further that the logged in member wishes to obtain additional information regarding his or her possible compatibility with one or more of the twelve matching members. In this case, the logged in member can request that a comparison be conducted between his or her media library and the media library of one or more of the twelve matching members.

Specifically, in response to a request from the logged in member, the matching/scoring engine 418 may conduct a comparison between the logged in member's media library and the selected matching member's media library, as indicated at block 534 (FIG. 5C). The results, such as the total score, may be presented to the logged in member, as indicated at block 536.

While the total score generated from the comparison between the logged in member's media library and the selected matching member's media library may not be as high as the top matches shown on the logged in member's homepage 900, the score may nonetheless be high enough to show that the logged in member and the selected matching member share some of the same interests in media. If the total score is sufficiently high, the logged in member may choose to contact the selected matching member. On the other hand, if the total score is low, the logged in member may decide not to contact that particular matching member at all.

In addition to obtaining a total score, a logged in member may request more detailed matching information, such as individual category scores and/or a list of matching artists, albums and/or song titles, etc.

In an embodiment, members may choose whether or not they are included in such matchmaking and/or searching operations. That is, members who are not interested in finding a possible companion may opt out of such matchmaking and/or searching operations, e.g., by selecting a check box or radio button on the member's profile or settings page.

In an embodiment, the contacted member may also obtain his or her score with the member who is making the contact. Depending on the score, the contacted member may choose to accept or decline the contact.

In another embodiment, rather than start the search process by searching other members through the information in their member profile records 432, the matching server 316 allows a logged in member to conduct searches of the members identified in the list of matching members presented on the homepage 900. That is, a member may utilize the results generated by the matching/scoring engine 418 to identify potential companions for the member. For example, a member may contact one or more other members who have been identified as having a high match, e.g., a high score. The logged in member may also direct the matching/scoring engine 418 to perform additional filtering on the list of matching members to identify those that might be a possible match for the first member, as indicated at block 538.

Specifically, the homepage 900 may include a Filter command button 912. Upon selection of the Filter command button 912 by the logged in member, the result presentation engine 424 may generate and transmit to the logged in member a filter webpage that allows the logged in member to specify one or more filter or search criteria to be applied to the list of matching members. For example, as in the above example, a logged in member may specify an age range, such as 25-30 years old, a sex, such as female, and a location, such as San Francisco, Calif. The filter webpage may include a series of check boxes, radio buttons or drop down lists that may be selected, as desired, by the logged in member.

The matching/scoring engine 418 receives the logged in member's entries, and filters the list of matching members using the criteria entered by the logged in member. In other words, in this embodiment, instead of searching the member profile records 432 of all members, only the records 432 of those members representing a high total score are searched. For example, the matching/scoring engine 418 may access the member profile records 432 of the members listed on the top matches pane 902, and identify those matching members who meet the specified criteria. That is, the matching/scoring engine 418 identifies those matching members who are between 25-30 years old, are female and live in the San Francisco area. The members who satisfy these search criteria, along with their corresponding matching scores, are then presented to the logged in member, as indicated at block 540.

Media Recommendation Service

In an embodiment, the matching system 318 is further configured to provide recommendations to members of other media that the members may like based on a comparison of members' media libraries.

Specifically, a command button or link, such as a Recommendations command button 936 (FIG. 9), may be provided on the home page 900. In response to a logged in member selecting the Recommendations command button 936, the matching/scoring engine 418 may search the media libraries of one or more other members for particular media that may be of interest to the logged in member, as indicated at block 542. For example, the matching/scoring engine 418 may be configured to examine the media libraries of all other members whose total score relative to the logged in member exceeds some threshold, thereby indicating a high degree of match. For such a designated media library, the matching/scoring engine 418 may access the information presented in the genre match tabbed pane 1102 (FIG. 11). For those particular genres that represent a high degree of match between the logged in member of the other member, such as Classical Piano, Classical, and Classical Voice—Opera, the matching/scoring engine 418 may search for song titles that correspond to those genres, and that are present in the other member's media library, but are not present in the logged in member's media library.

Suppose the other member's media library includes fifteen classical piano pieces, twenty-seven classical pieces, and eleven classical voice—opera pieces that appear in the other member's media library, but do not appear in the logged in member's media library. The identity of these other media files, e.g., by title, artist and/or album, is provided by the matching/scoring engine 418 to the result presentation engine 424. The result presentation engine 424 may generate and transmit this information to the logged in member, e.g., through his or her browser. That is, the logged in member is presented with the list of fifteen classical piano pieces, twenty-seven classical pieces, and eleven classical voice—opera pieces from the other member's media library.

It should be understood that the matching/scoring engine 418 may use matching artist and album information from the logged in member's media library and the other member's media library in determining recommendations to the logged in member. For example, suppose that the top matching genre between two media libraries is classical piano and that the top matching artists is Vladimir Horowitz. In this case, the logged in member may be presented with those Vladimir Horowitz classical piano pieces that appear in the other member's media library, but not in the logged in member's media library.

In an embodiment, the matching system 316 may include or have access to a media purchase service, such as the iTunes Store from Apple, Inc., the on-line store www.amazon.com, etc., and the logged in member may purchase and download, or order, one or more of the recommendations.

The foregoing description has been directed to specific embodiments of the present invention. It will be apparent, however, that other variations and modifications may be made to the described embodiments, with the attainment of some or all of their advantages. For example, other information may be included in the member media records and utilized by the matching/scoring engine, such as book titles ordered from an on-line bookstore, such as amazon.com, movies ordered through an on-line service, such as netflix.com, etc. Therefore, it is the object of the appended claims to cover all such variations and modifications as come within the true spirit and scope of the invention.

What is claimed is:

1. A method for comparing digital media files to find persons who share similar interests, the method comprising:
   storing, in a digital memory, a plurality of data sets, where the data sets contain information descriptive of a plurality of digital media files that are acquired by respective users, the descriptive information
      automatically created by media player applications of the respective users and
      including, for at least some of the plurality of digital media files, a genre descriptor, an artist descriptor, an album descriptor, and a title descriptor;
   storing, in the digital memory, a plurality of user profile records, where each user profile record contains personal identifying characteristics of one of the respective users;
   receiving a search criteria from a first user;
   searching, by a processor coupled to the digital memory, the plurality of user profile records based on the received search criteria to identify a set of user profile records whose personal identifying characteristics match the received search criteria;
   comparing, by the processor, a first data set containing information descriptive of a first plurality of digital media files acquired by the first user with a second data set containing information descriptive of a second plurality of digital media files acquired by a second user whose user profile record was identified as matching the received search criteria;
   generating a genre score that represents a degree of similarity between the genre descriptors;
   generating an artist score that represents a degree of similarity between the artist descriptors;
   generating an album score that represents a degree of similarity between the album descriptors;
   generating a title score that represents a degree of similarity between the title descriptors;
   generating an overall score for the first and second users based on an amount of descriptive information that is common between the first and second data sets, wherein the generated overall score for the first and second users represents a degree of similarity between the plurality of media files acquired by the first user and the plurality of media files acquired by the second user; and
   transmitting, by a network interface coupled to the processor, the generated overall score for the first and second users to the first user.

2. The method of claim 1 wherein the descriptive information includes one or more song titles, one or more artist names, one or more album names, and one or more music genres.

3. The method of claim 1 further comprising:
   receiving the descriptive information from the respective users; and
   converting, by the processor, the descriptive information received from each user into one of the data sets having a predefined structure.

4. The method of claim 1 wherein the descriptive information includes one or more movie titles, one or more actor names, and one or more movie genres.

5. The method of claim 1 wherein the user profile information includes contact information, the method further comprising:
   transmitting, by the network interface, the contact information of the second user to the first user.

6. The method of claim 5 wherein the generated overall score and the contact information are transmitted in a format for display by a web browser application.

7. The method of claim 1 wherein the received search criteria includes at least one of a sex, an age, and a location.

8. A method for generating media recommendations, the method comprising:
   storing, in a digital memory, a plurality of data sets, where the plurality of data sets contain information descriptive of a plurality of digital media files that are acquired by respective users, the descriptive information
      automatically created by media player applications of the respective users and
      including, for at least some of the plurality of digital media files, a genre descriptor, an artist descriptor, an album descriptor, and a title descriptor;
   comparing, by a processor coupled to the digital memory, a first data set containing information descriptive of a first plurality of digital media files acquired by a first user with a group of data sets containing information descriptive of a plurality of digital media files acquired by other users;
   generating a genre score that represents a degree of similarity between the genre descriptors;
   generating an artist score that represents a degree of similarity between the artist descriptors;
   generating an album score that represents a degree of similarity between the album descriptors;
   generating a title score that represents a degree of similarity between the title descriptors;
   generating a plurality of overall scores for the first and the other users based on an amount of descriptive information that is common between the first data set associated with the first user and each data set of the group of data sets associated with each other user, wherein each overall score represents a degree of similarity between the plurality of media files acquired by the first user and the plurality of media files acquired by each other user;
   searching a plurality of user profile records that include personal identifying characteristics of the respective users to identify one or more of the plurality of user profile records whose personal identifying characteristics match a received criteria;
   identifying at least one data set associated with one of the other users whose generated overall score exceeds a threshold degree of commonality with the first data set;

for at least one genre that is common between the first data set and the at least one other data set, identifying one or more media titles from the at least one data set that do not exist in the first data set;

transmitting, by a network interface coupled to the processor, the identified media titles from the at least one data set that do not exist in the first data set to the first user; and transmitting to the first user an indication of the one or more of the plurality of user profile records whose personal identifying characteristics match the received criteria.

9. The method of claim 8 wherein the genres are musical genres and the media titles are song titles.

10. A server comprising:
at least one network interface card configured to transmit and receive messages across a communication network,
a memory configured with a database of media records and user profile records, where the media records store information descriptive of media libraries that are associated with respective users, and each user profile record stores personal identifying characteristics associated with one of the respective users;
a processor, and
at least one bus interconnecting the at least one network interface card, the memory, and the processor, wherein the processor is configured to:
  receive search criteria from a first user,
  search at least some of the user profile records to identify a set of user profile records that match the received search criteria,
  compare a first media record of a first user with a second media record of a second user whose user profile record matched the received search criteria,
  in response to the comparison, identify descriptive information that is common between the first media record of the first user and the second media record of the second user, wherein the descriptive information includes a genre descriptor, an artist descriptor, an album descriptor, and a title descriptor,
  generate a genre score that represents a degree of similarity between the genre descriptors,
  generate an artist score that represents a degree of similarity between the artist descriptors,
  generate an album score that represents a degree of similarity between the album descriptors,
  generate a title score that represents a degree of similarity between the title descriptors,
  generate an overall score for the first and second users based on an amount of the descriptive information that is common between the first media record of the first user and the second media record of the second user, wherein the generated overall score for the first and second users represents a degree of similarity between the media library of the first user and the media library of the second user whose user profile record matched the received search criteria, and
  cooperate with the at least one network interface card to transmit the generated overall score for the first and second users to the first user.

11. The server of claim 10 wherein a category of descriptive information stored in the media records includes one or more of an artist name, a song title, an album title, and a musical genre.

12. The server of claim 11 wherein
the processor is further configured to apply at least one algorithm to generate the overall score, and
the at least one algorithm includes a first weighting for the musical genre and a second weighting for the artist name.

13. The server of claim 10 wherein the received search criteria include one or more of a sex, an age, and a location.

14. The server of claim 10 wherein at least one of the user profile records and the media records are stored remotely to the server.

15. The server of claim 10 wherein the processor is further configured to:
receive the descriptive information from the respective users; and
convert the descriptive information received from each user into one of the media records, wherein the media records have a common structure.

16. The method of claim 1 further comprising displaying to the first user, on a display, the generated overall score and an identifier associated with the second user.

17. The method of claim 8 further comprising displaying to the first user, on a display, each of the generated overall scores, a user name of an other user associated with each of the generated overall scores, and a member link associated with each of the user names.

18. The method of claim 1 wherein a plurality of ratings are assigned to at least some of the plurality of digital media files of the respective users, the method further comprising:
applying at least one algorithm to generate the overall score, the at least one algorithm configured to account for the plurality of ratings assigned to at least some of the plurality of digital media files.

19. The method of claim 1 further comprising:
presenting at least one of the generated genre, artist, album, and title scores to the first user.

* * * * *